United States Patent
Battistini et al.

(10) Patent No.: US 6,676,826 B2
(45) Date of Patent: Jan. 13, 2004

(54) METHOD FOR PRODUCTION OF A ROTOR FOR CENTRIFUGAL COMPRESSORS

(75) Inventors: Verter Battistini, Campi Bisenzio (IT); Umberto Mariotti, Florence (IT)

(73) Assignee: Nuovo Pignone Holding S.p.A., Florence (IT)

( * ) Notice: Subject to any disclaimer, the term of this patent is extended or adjusted under 35 U.S.C. 154(b) by 45 days.

(21) Appl. No.: 09/988,981

(22) Filed: Nov. 21, 2001

(65) Prior Publication Data

US 2002/0062561 A1 May 30, 2002

(30) Foreign Application Priority Data

Nov. 30, 2000 (IT) ........................ MI2000A2595

(51) Int. Cl.[7] .......................... B23H 11/00; B23H 3/00; B23H 5/00; B23H 7/00; B23H 9/00
(52) U.S. Cl. .................. 205/674; 205/640; 205/660; 205/673; 205/654; 205/646; 205/648; 205/650; 205/666
(58) Field of Search ................... 205/640, 660, 205/673, 654, 646, 648, 650, 666, 674

(56) References Cited

U.S. PATENT DOCUMENTS

| 4,502,837 A | 3/1985 | Blair et al. |
| 4,653,976 A | 3/1987 | Blair et al. |
| 4,851,090 A * | 7/1989 | Burns et al. ................ 205/670 |

* cited by examiner

*Primary Examiner*—Wesley A. Nicolas
(74) *Attorney, Agent, or Firm*—Nixon & Vanderhye P.C.

(57) ABSTRACT

A method for production of a rotor for centrifugal compressor, wherein the said rotor is produced from a monolithic disc, which is provided with a central hole. The method consists of use, within an isolating medium, of at least one first electrode which has polarity opposite the polarity of the rotor, wherein the said first electrode operates starting from the outer diameter of the monolithic disc, in order to produce the blades and the cavities of the said rotor, and wherein the processing takes place with a continuous path, consisting of a first step of roughing, followed by a second step of finishing with a tool which has a shape similar to that of the electrode used for the first roughing step, in order to produce an accurate geometry of the blades.

10 Claims, 4 Drawing Sheets

METHOD FOR PRODUCTION OF A ROTOR FOR CENTRIFUGAL COMPRESSORS

BACKGROUND

The present invention relates to a method for production of a rotor for centrifugal compressors.

The term centrifugal compressor normally defines a machine which restores a compressible fluid, at a pressure which is greater than that at which it received the fluid, imparting to the latter the energy necessary for the change of pressure by means of use of one or a plurality of rotors or impellers, each of which consists of a certain number of blades, which are disposed radially such as to form a certain number of passages which converge towards the centre of the rotor.

More particularly, high-pressure centrifugal compressors are normally equipped with rotors 20 which are tested in a standard manner.

It should be noted that, for a given diameter, the geometry of the rotor is fixed, and is the same for different applications, a fact which will assume particular relevance in the following description of the method according to the invention.

More particularly, the main parts of these rotors for centrifugal compressors are the hub, the shroud and the blades.

Owing to the high density of the gases, a truly critical problem in the technical field of high-pressure compressors is that of guaranteeing the stability of the rotor.

Combined forces, which are proportional to the density of the gas, and are induced by the labyrinth for the gases, can cause unacceptable sub-synchronous vibrations which have an effect on the said rotor.

In fact, the sensitivity of the rotor to these forces increases more or less in proportion with the flexibility of the rotor.

In addition, the entire dynamic behaviour of the rotor is particularly critical for this type of application, and the simplest means for increasing the rigidity of the rotor in the same operative conditions (same bearings, same temperature, same pressure of the gas, etc) is that of using shafts which have large diameters.

The diameters both of the shafts and of the hubs have thus been increased in the known art, such as to increase the lack of sensitivity to external disturbances, and therefore to improve the characteristic rotodynamic behaviour of high-pressure centrifugal compressors.

The spacers have thus been eliminated, and the aerodynamic path is obtained directly on the shaft.

More specifically, two rings, the front one of which is in two pieces, and the rear one which is in a single piece, maintain the axial position, whereas a coating with a high level of hardness protects the shaft.

These characteristics assure that the aerodynamic path does not change, and ensure that this configuration is particularly efficient in increasing the rigidity of the shaft; however, these changes mean that a different technology must be taken into consideration for production of these rotors for centrifugal compressors.

With particular reference to the known art, it should be noted that the blades are conventionally obtained by means of milling the hub (or shroud), and subsequently the welding is carried out from the interior of the aperture, in order to join the parts.

Another technique is used for rotors with a low flow coefficient, in which the blades are too thin to make it possible to carry out the welding from the interior.

In fact, in this technique, the two parts are slot-welded from the rear of the hub (the blades are machined on the shroud), owing to the presence of the nose or front portion of the shroud, which has the same diameter as the main end of the blade.

After the welding has been carried out, the heat treatment is also carried out, which, as will be appreciated, reduces the residual tensions which have formed.

Each rotor is separated from the others by a spacer, in order to create the necessary aerodynamic space at the intake of the rotor.

Thus, on these bases, it is apparent that it becomes very difficult to increase the diameter of the hub, and thus the diameter of the slot-welding, from the exterior. BRIEF DESCRIPTION OF THE INVENTION The object of the present invention is thus to provide a method for production of a rotor for centrifugal compressors, such that the above-described requirements are fulfilled.

Another object of the present invention is to provide a method for production of a rotor for centrifugal compressors, which makes it possible to obtain a very high level of dimensional accuracy, which is in line with the required expectations.

Another object of the present invention is to provide a method for production of a rotor for centrifugal compressors, which provides the possibility of obtaining a high level of structural resistance of the rotor.

A further object of the present invention is to provide a method for production of a rotor for centrifugal compressors, which makes it possible to obtain a high level of dimensional accuracy, as well as an optimum surface quality of the finished product.

These objectives and others according to the invention are achieved by a method for production of a rotor for centrifugal compressors, wherein the said rotor is produced from a monolithic disc, provided with a central hole, characterised in that it consists of use, within an isolating medium, of at least one first electrode which has polarity opposite that of the polarity of the said rotor, wherein the said first electrode operates starting from the outer diameter of the said monolithic disc, in order to produce the blades and the cavities of the said rotor, and wherein this processing takes place with a continuous path consisting of a first step of roughing, followed by a second step of finishing with a tool which has a shape similar to that of the electrode used for the first roughing step, in order to produce an accurate geometry of the said blades.

According to one embodiment, the method according to the invention includes a further step of finishing, in which an electrode operates on the surfaces of the blades, at the inner portion of the said rotor, in order to round the main ends of the said blades, on the inner side of the disc.

As an alternative, according to a preferred variant of the method, an electrode 15 carries out at least the first step of roughing wherein the said electrode is shaped such as to be able to produce the profile of each of the blades, both on the pressure side and on the suction side.

In fact, this electrode has a first and a second portion, which are separated from one another by the space which is necessary for the presence of a blade.

Further characteristics of the method for production of a rotor, according to the present invention, are defined in the other claims attached to the present application.

The characteristics and advantages of the method for production of a rotor for centrifugal compressors, according to the present invention, will become more apparent from the following description of a typical embodiment, provided by way of non-limiting example, with reference to the attached schematic drawings described below.

DETAILED DESCRIPTION OF THE INVENTION

Figure 1:
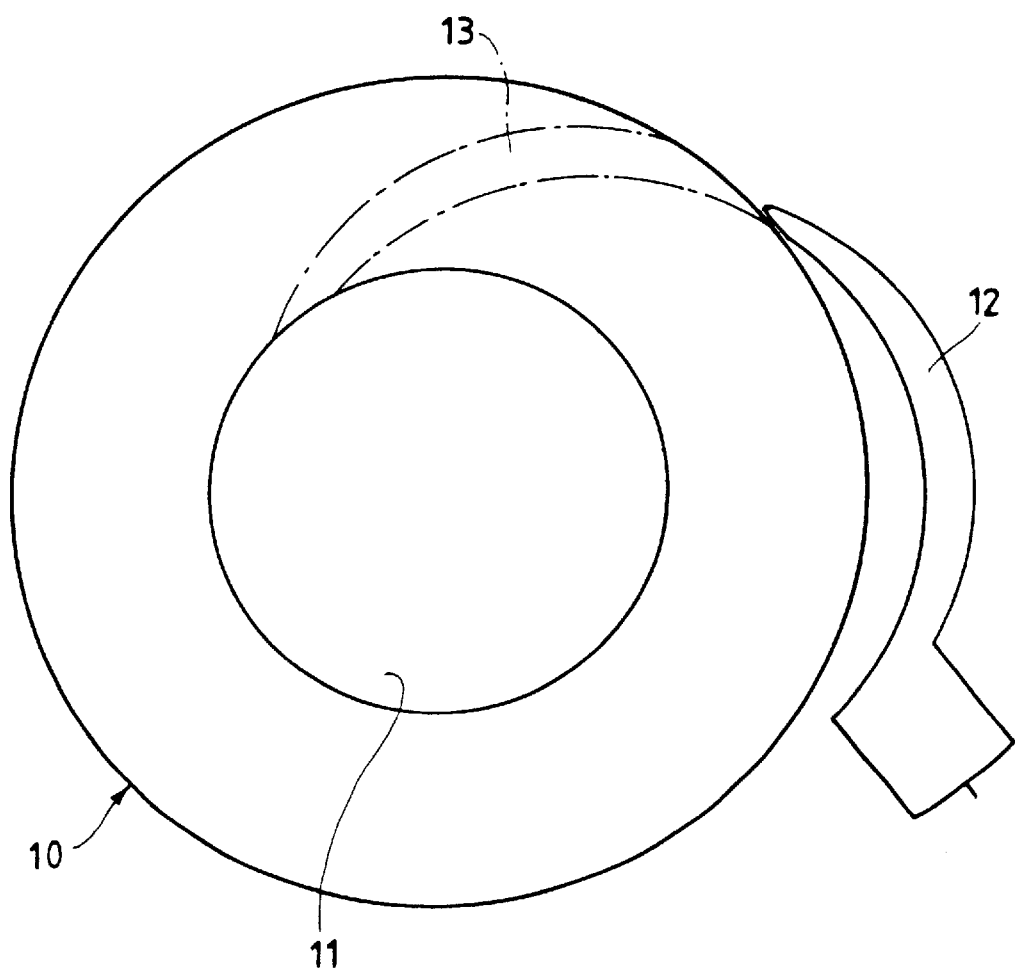
FIG. 1 represents an electrode for electroerosion, which acts on a rotor which is destined for a centrifugal compressor, according to the method of the invention, in a first operative position of erosion.

With particular reference to the figures in question, the method according to the invention will now be described, on the understanding that the method of electroerosion has finally been selected from amongst the different processing methods.

In fact, it is understood that, in the processing operations for electroerosion, two metal parts are immersed in an isolating liquid, and are connected to a source of electrical energy.

When the power is switched on, an electric voltage is created between the two metal parts.

If the two parts are taken together to the correct distance, the electric voltage is discharged, and an electric spark passes through the distance between the two parts.

At the point at which this spark strikes, the metal is heated to the extent that it melts.

After application of a large number of these sparks, which are emitted one after another (and never simultaneously), it is possible to produce gradually the required shape in the piece of metal, according to the shape of the electrode.

A few hundred thousand of these sparks must be produced every second, before the erosion takes place.

The results are highly variable, depending on the intensity, frequency, duration, length and polarity of the discharges.

There are two different methods for electroerosion, which are known technically by the names of die-sinking EDM, and wire-cut EDM, where EDM stands for Electrical Discharge Machining.

In both the aforementioned electroerosion methods, the electrical energy of the electrical supply source is transformed, according to the results required, by means of controlled pulse generators of a type with highly developed technology.

The EDM process usually takes place in an isolating liquid, which is continually regenerated and filtered, such as to remove all the metal residues.

By this means, the external conditions remain unchanged during the entire process, even if this lasts for hours or days.

The possibilities provided by the present devices are enormous, i.e high speed of cutting and removal, extremely efficient automatic operations, interconnection and storage of recurrent and very lengthy processing cycles, and virtually 100% monitoring of the final shape and of the metal surfaces which are processed, from perfectly smooth to extremely rough.

Owing to these special properties, EDM is considered as a technology with great future prospects.

In the case of die-sinking EDM technology, the shape required is formed negatively in the metal, with a three-dimensional electrode.

By means of superimposition of the movements on the three main axes x, y and z, the most varied shapes, indentations and cavities can be created, in a manner which cannot be obtained by means of any other processing system.

For example, it is possible to produce a helical cavity or a rectangular hole in a single block of steel, or a very thin, hardened metal sheet which cannot be subjected to mechanical pressure, can be processed.

In the case of the wire-cut EDM process, the shape required is stored in the computer, and is conveyed in the form of codes which can be understood by the machine, which subsequently cuts the shape independently, guiding the wire along the path.

In the case of complicated shapes which required cuts, or angled, conical or other unusual surfaces, the upper and lower wire guiding systems perform the different movements depending on the cases.

With reference now in greater detail to the description of the method for production of the centrifugal compressor rotor, the following comments are made.

As shown clearly in FIG. 1, the starting point is a monolithic disc 10, made of steel which is perforated centrally by the hole 11, in order to produce the radial compressor rotors by means of electroerosion.

More particularly, according to the method of the present invention, numerically controlled machines are preferably used.

The tools for the method and the rotor itself are electrodes with opposite polarity, and the isolating means are normally oil or specific fluid with a high level of resistivity.

Two different types of tools are used in order to produce the rotor.

A first electrode, indicated by the reference number 12, is able to produce the blades 14 and the cavities 13 of the rotor, starting from the outer diameter of the disc 10.

Figure 2:
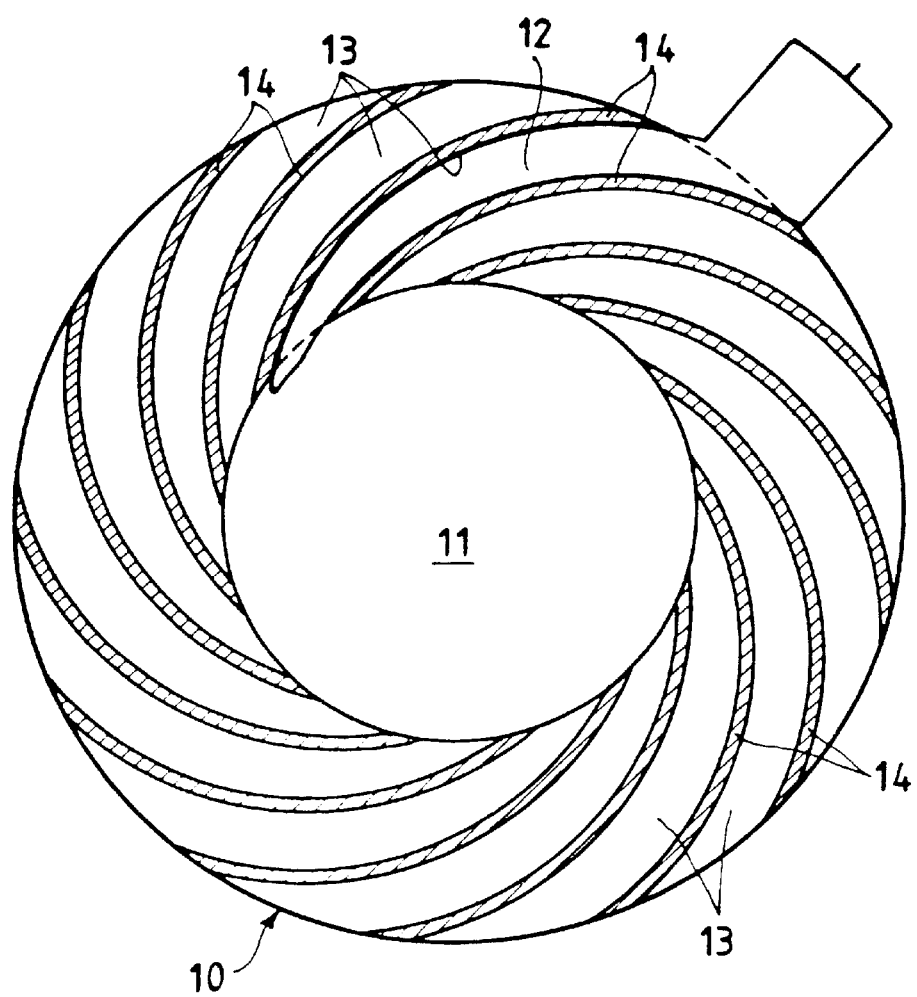
FIG. 2 represents the electrode for electroerosion in FIG. 1, which acts on the rotor of the compressor, in a second operative position.

The first electrode 12 has the same shape as the aperture itself of the cavity 13, and moves as illustrated in FIGS. 1–2, in which the initial position and the final position can be seen.

The final result of this first step is also shown in FIG. 2, where the parts of material left between the erosions of the electrode 12 are the outer surfaces, which are still rough, of the rotor blades 14.

Since it is a planar object, the electrode 12 must also move in an axial direction.

The processing with a continuous path begins with general erosion, which is followed by a step of finishing with a specific tool, the shape of which is similar to the electrode 12, but which makes it possible to produce accurate geometry of the blades 14.

When the electrode 12 completes its work, the blades 14 on the inner side of the disc 10 have a flat main end.

Figure 4:
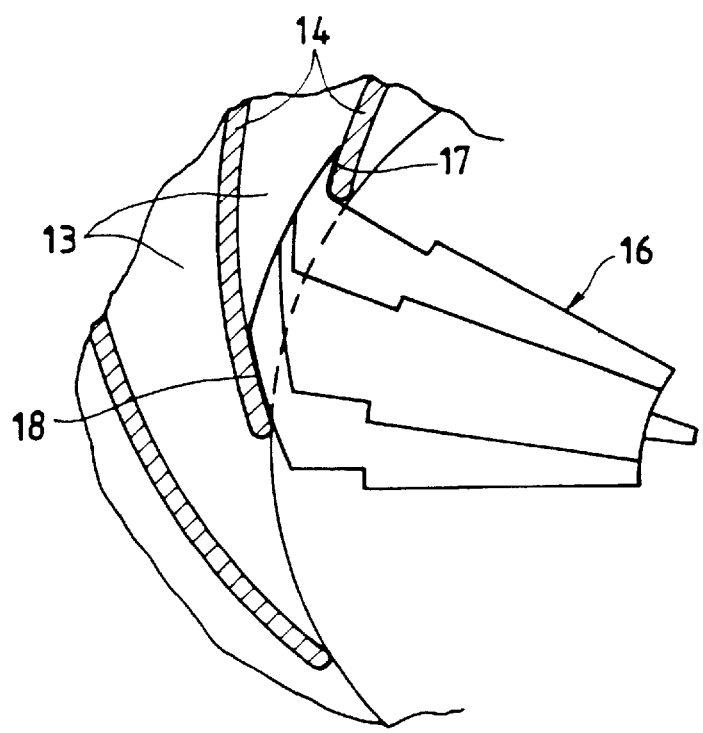
FIG. 4 represents a third electrode for electroerosion, which acts on the inner part of the rotor in FIG. 1, in yet another operative position.
Figure 5:
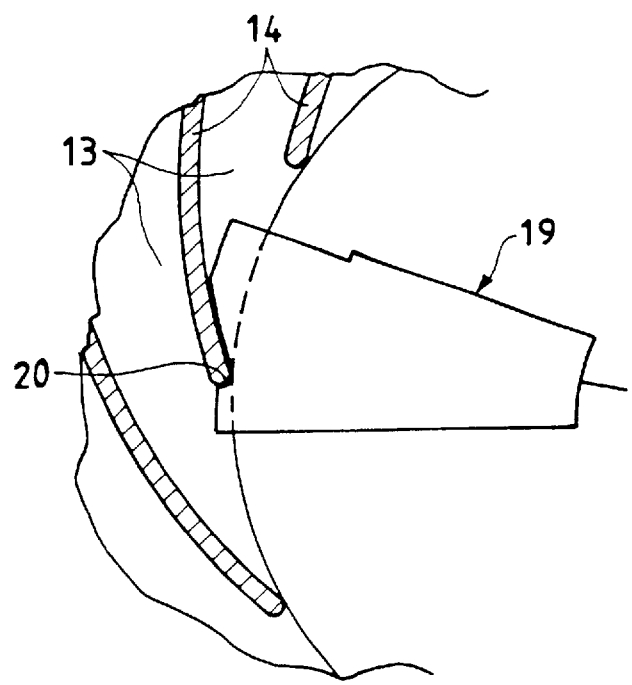
FIG. 5 represents a fourth electrode for electroerosion, which acts on the inner part of the rotor in FIG. 1, in yet another operative position.

It is therefore necessary to carry out the processing illustrated in FIGS. 4–5, where another electrode 16 operates on the surfaces 17 and 18 of the blades 14, as well as to use a further electrode 19 which can operate on the surface 20.

Figure 3:
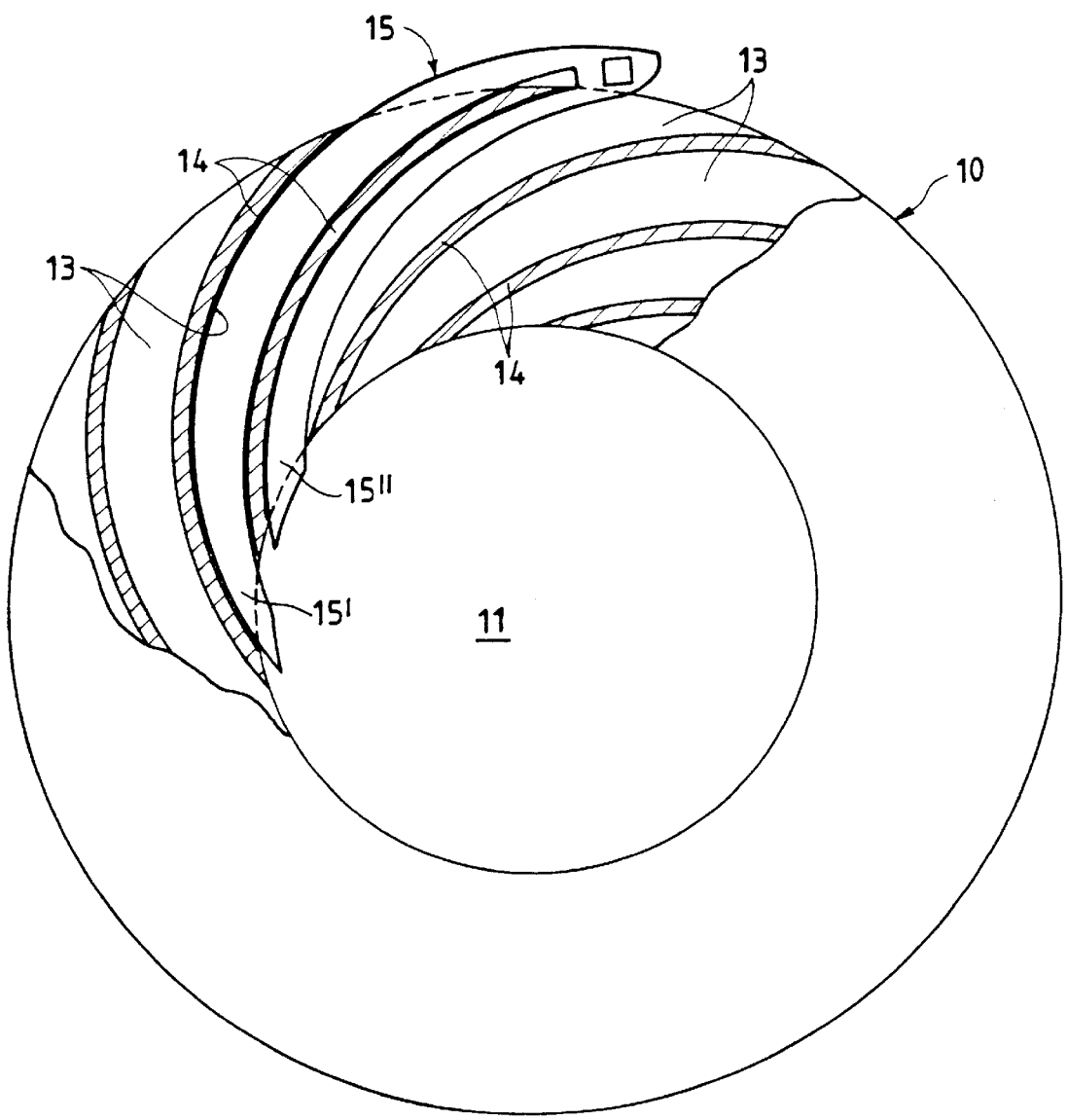
FIG. 3 represents a second electrode for electroerosion, which acts on the rotor in FIG. 1, in another operative position.

Alternatively, an electrode 15 which has the particular shape represented in FIG. 3 can carry out the roughing step of the electroerosion method.

In fact, owing to its own particular shape, this electrode 15 produces the profile of the blade 14, both on the pressure side and on the suction side.

More particularly, the electrode 15 has a first and a second portion 15', 15", which are separated from one another by the space necessary for the presence of a blade 14.

The following description makes apparent the characteristics and advantages of the method according to the present invention, for production of a rotor for centrifugal compressors.

The following concluding points and observations are now made, such as to define the said advantages more clearly and accurately.

Firstly, by means of use of the method according to the invention, it is possible to increase the diameter of the hub of the rotor.

In addition to the possibility of increasing the diameter of the hub of the rotor, the main advantages of use of electroerosion are firstly the lack of structural discontinuity.

Another important advantage is provided by the possibility of obtaining a high level of structural resistance, as well as of obtaining a high level of dimensional accuracy, and finally an optimum surface quality of the finished product.

All these points are particularly important when rotors which are designed for machines with re-injection at high pressure are produced.

In fact, owing to the high pressure and high density involved, the pressure pulses which originate from the asymmetry of the aerodynamic field, particularly in the phase known as discharge scroll, can give rise to significant periodic forces.

However, in this context, it can be appreciated that the method according to the invention makes it possible to avoid any metallurgical discontinuity inside the rotor, a fact which clearly represents a significant technological step forward.

In terms of dimensional accuracy, the centrifugal compressors in question are normally characterised by a very low flow coefficient.

From a geometric point of view, this results in very thin aerodynamic passages, sometimes of approximately 0.3–0.4".

The distortion which is associated with the processing known as slot welding can modify the width of the blade by 5% or more, for these rotors which have a low flow level.

On the other hand, by means of spark erosion or electroerosion according to the method described, the accuracy which can be obtained is 1–2%, a fact which permits a more accurate match between the performance levels expected and those obtained.

Finally, it is apparent that many other variations can be made to the method for production of a rotor for centrifugal compressors, which is the subject of the present invention, without departing from the principles of novelty which are inherent in the inventive concept.

It is also apparent that, in the practical application of the invention, any materials, dimensions and forms can be used according to requirements, and can be replaced by others which are technically equivalent.

What is claimed is:

1. A method for producing a rotor for a centrifugal compressor by electroerosion wherein said rotor is produced from a monolithic disk formed with a central hole, the method comprising:

providing an electrode with a polarity opposite a polarity of said monolithic disk within an isolating fluid having a high level of resistivity;

applying said electrode to said disk, starting from an outer diameter of said disk, along a predetermined path in a first roughing step to thereby form blades and cavities between the blades, followed by a second finishing step utilizing a tool similar to said electrode to thereby form an accurate geometry of said blades.

2. Method according to claim 1, comprising a third finishing step, in which at least one additional electrode operates on the surfaces of the said blades.

3. Method according to claim 1, characterised in that an wherein said electrode carries out at least the said first roughing step AND wherein the said electrode is shaped such that the said electrode can produce a profile of each of said blades, both on a pressure side and on a suction side of said blades.

4. Method according to claim 3, wherein said electrode has a first and a second portion separated by a space necessary for the presence of a blade.

5. Method according to claim 1, wherein said electrode has a shape substantially the same as one of said cavities, and moves along a curve which is defined by points, and can be assimilated to an arc of circumference.

6. Method according to claim 1, wherein the said isolating fluid is continually regenerated and filtered such as to remove all the metal residues.

7. Method according to claim 6, wherein said electrode is three-dimensional, and the shape required is formed negatively in the metal of the said disc, and further wherein, by means of superimposition of movements by said electrode on three main axes x, y and z, predetermined shapes, indentations and cavities can be created.

8. Method according to claim 1, wherein required shape is stored in a computer memory, and is conveyed to a wire-cut EDM machine in the form of codes which can be understood by said EDM machine, which subsequently cuts the required shape independently, guiding the electrode along the said predetermined path.

9. Method according to the claim 1 wherein said isolating medium comprises oil.

10. A method for producing a rotor for a centrifugal compressor by electroerosion wherein said rotor is produced from a monolithic disk formed with a central hole, the method comprising:

providing an electrode with a polarity opposite a polarity of said monolithic disk within an isolating fluid having a high level of resistivity;

applying said electrode to said disk, starting from an outer diameter of said disk, along a predetermined path in a first roughing step to thereby form blades and cavities between the blades, followed by a second finishing step utilizing a tool similar to said electrode to thereby form an accurate geometry of said blades; and wherein said electrode has a first and a second portion separated by a space necessary for the presence of a blade.

* * * * *

UNITED STATES PATENT AND TRADEMARK OFFICE
CERTIFICATE OF CORRECTION

PATENT NO. : 6,676,826 B2
DATED : January 13, 2004
INVENTOR(S) : Battistini, V. et al.

It is certified that error appears in the above-identified patent and that said Letters Patent is hereby corrected as shown below:

Column 2,
Line 17, "BRIEF DESCRIPTION OF THE INVENTION" should be a separate heading, all on line 18.

Column 6,
Line 21, "characterised in that an" before "wherein said electrode" should be deleted.
Line 23, "AND" should read -- and --.
Line 23, "the" before "said electrode" should be deleted.
Line 34, "the" before said isolating" should be deleted.
Line 36, "the" before "metal residues" should be deleted.
Line 43, "wherein required" should read -- wherein a required --
Line 48, "the" before "said predetermined" should be deleted.
Line 49, "the" before "claim 1" should be deleted.

Signed and Sealed this

Sixth Day of July, 2004

JON W. DUDAS
*Acting Director of the United States Patent and Trademark Office*